United States Patent
Ashley

(12)
(10) Patent No.: US 6,672,097 B1
(45) Date of Patent: Jan. 6, 2004

(54) FLAVORED ICE CARTRIDGE DISPENSER FOR ICE MAKER

(76) Inventor: Josh Ashley, 7 Venezia, Newport Coast, CA (US) 92657

( * ) Notice: Subject to any disclaimer, the term of this patent is extended or adjusted under 35 U.S.C. 154(b) by 0 days.

(21) Appl. No.: 10/377,419

(22) Filed: Feb. 28, 2003

(51) Int. Cl.$^7$ .................................................. F25C 1/00
(52) U.S. Cl. ........................................... 62/340; 62/356
(58) Field of Search ............................. 62/66, 340, 353, 62/356

(56) References Cited

U.S. PATENT DOCUMENTS

| | | | |
|---|---|---|---|
| 4,901,539 A | * | 2/1990 | Garber et al. .................. 62/306 |
| 5,394,705 A | * | 3/1995 | Torii et al. ....................... 62/74 |
| 6,513,337 B1 | * | 2/2003 | Astvatsatrian et al. .......... 62/66 |

* cited by examiner

Primary Examiner—William E. Tapolcai
(74) Attorney, Agent, or Firm—Stetina Brunda Garred & Brucker

(57) ABSTRACT

A system for forming flavored ice from a refrigerator/freezer having an ice maker fluidly connected to a water source. A fluid dispersing module is formed along a water conduit to define a water source inlet port and an ice maker outlet port disposed on opposing ends thereof which are placed into fluid communication with the water source and the ice maker respectively. A fluid cartridge is pre-filled with a metered quantity of a flavored fluid mixable with water and has a cartridge inlet and outlet ports formed on opposing ends thereof which are sized and configured to engage the water source inlet port and the ice maker outlet port respectively. The fluid cartridge is connectable to the module and placeable into fluid communication with the water source and the ice maker to mix the flavored fluid and the water together and form a flavored mixture transferrable to the ice maker.

29 Claims, 4 Drawing Sheets

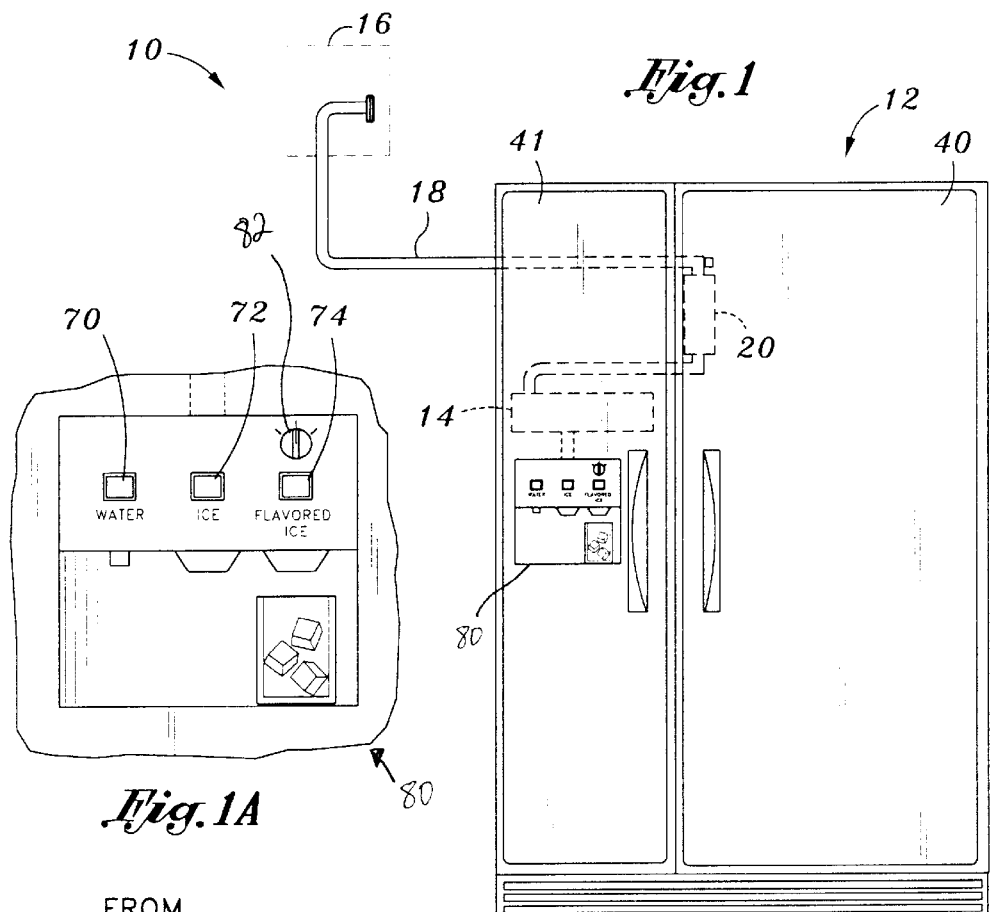
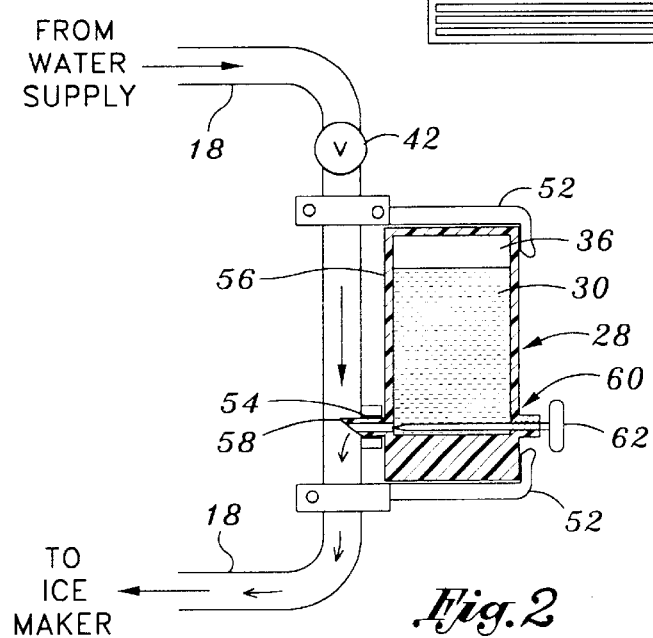

FLAVORED ICE CARTRIDGE DISPENSER FOR ICE MAKER

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention generally relates to a system for forming flavored ice from a conventional ice maker installed within a refrigerator/freezer. Conventional refrigerators/freezers typically include a refrigerated section and a freezer section which are separated into two distinct compartments. It is generally known that refrigerators/freezers also typically include automatic ice-making machines disposed within the freezer section. The ice maker is generally connected to a water source via a pipe or waterline located within the consumers' house. This waterline provides water to the ice makers and may additionally provide refrigerated water available to the consumers from the refrigerated section.

Conventional automatic ice maker machines located in consumer's refrigerators/freezers are activatable by the consumer to initiate an ice-making process which allows water from the waterline to flow into a reservoir located within the ice maker. The ice maker then segregates the water into cubes or other compact pieces and allows the water to freeze due to the temperature in the freezer. Once frozen, ice cubes are ejected into a holding bin located within the freezer section of the consumer's refrigerator/freezer. Typically, water purifying systems are also frequently placed inline with the waterline to filter, or otherwise purify, the water flowing into the refrigerated water system and the ice maker. Thus, water and ice may be provided to the consumer which is created from filtered/purified water.

Consumers generally enjoy chilled beverages by placing such beverages over ice such as ice cubes. Typically, consumers will pour the beverage into a drinking cup or glass cup, and fill the cup with ice obtained from their freezer section's ice-maker to quickly chill their beverage. However, this commonly-used method of beverage chilling has several disadvantages.

As is well known, ice cubes typically melt at a fairly rapid rate when placed within warmer beverages. The resulting effect of such melting is that the beverage becomes diluted by the melted ice. Such dilution is generally undesirable by consumers since most beverages are typically premixed with fairly high precision to ensure that the consumer experiences the same beverage taste each time such beverage is consumed. Dilution is especially undesirable when ice cubes are used in conjunction with soda and other carbonated beverages since carbonated beverages are generally more susceptible to dilution due to the rapid rate at which carbonation dissipates therefrom. Therefore, adding ice cubes to carbonated beverages dilutes the concentration of the same and may otherwise render the beverage "flat" due to the lack of carbonation.

Additionally, children and adults generally enjoy frozen foods such as ice cream and popsicles which are available at most markets. While ice cream is generally made of frozen dairy products, popsicles are generally made from flavored ice. If one wished to prepare a homemade popscile or flavored ice, a mixture would need to be prepared which is then transferred to a container and then placed in a freezer. Disadvantageously, the process is relatively difficult and imprecise since one would need to approximate a mixture of a flavored syrup and water to obtain a pleasing flavored ice product. Invariably, each time such a mixture is attempted by a consumer, due to the inaccuracies in the repeatability of homemade processes, the resulting product may have a different concentration and overall taste each time.

Therefore, there exists a need for a simple system which produces a predictable-tasting flavored ice product. There is additionally a need for a system which allows consumers to chill beverages or create beverages in the consumers' home using their refrigerator/freezer so as to minimize dilution of a beverage. Additionally, there is a need for a flavored ice cartridge dispenser which may be produced with a flavored ice dispenser installed therein or retrofitted to an existing conventional refrigerator/freezer ice box.

BRIEF SUMMARY OF THE INVENTION

The present invention specifically addresses and alleviates the above-identified deficiencies in the art. Specifically, the present invention fulfills a long-felt need by providing a simple flavored ice dispensing system which repeatedly produces a predictable-tasting flavored ice product. Advantageously, the system produces a flavored ice product which may be consumed alone or placed into a cup or glass to produce an ice-cold beverage with a predictable taste. Even further, due to the quick-connect cartridge or module provided in the system, one of several different selected flavors may be used to produce the flavored ice product. For example, fruit flavors may be used to create popsicle-like flavored ice products or coffee flavors may be used to produce iced coffee liquid beverages. Additionally, several different flavors of ice products produced by the system may be combined together in a blender with water. In this respect, the present invention also allows consumers to produce slushies, smoothies, alcoholic beverage supplements, and other desirable cold ice/liquid products. To accommodate consumers having conventional refrigerators/freezers, the present invention may be retrofitted to such existing conventional refrigerators/freezers with relative ease by removing a section of the refrigerator/freezers's water conduit and replacing the same with a fluid dispersing module.

In this regard, there is provided a system for forming flavored ice from a refrigerator/freezer having an ice maker fluidly connected to a water source. The system includes a water conduit extending between the ice maker and the water source. The water conduit further includes a shut-off valve disposed adjacent thereto and positioned in-line between the water source and the fluid dispersing module. The water conduit may be sized and configured to deliver fluid pressure from the water source to the fluid dispersing module and subsequently to the ice maker at a pressure in the range of from about 20 PSI to about 100 PSI.

The fluid dispersing module defines a water source inlet port and an ice maker outlet port disposed on opposing ends thereof. The water source inlet port and the ice maker outlet port are placed into fluid communication with the water source and the ice maker respectively. Optionally, the fluid dispersing module may be disposed within the refrigerated portion of the refrigerator/freezer.

The system also includes a fluid cartridge pre-filled with a metered quantity of a flavored fluid mixable with water.

Preferably, the flavored fluid is a concentrated syrup. The fluid cartridge has a cartridge inlet port and a cartridge outlet port formed on opposing ends thereof. The fluid cartridge may define a fluid reservoir sized and configured to retain the metered quantity of flavored fluid therein. Optionally, the fluid reservoir defines a fluid restriction member formed therewithin which is positioned therein to mix a portion of the flavored fluid with the water.

The cartridge inlet port and the cartridge outlet port are sized and configured to engage the water source inlet port and the ice maker outlet port respectively. The fluid cartridge is disposable within the fluid dispersing module and placeable into fluid communication with the water source and the ice maker so as to receive water from the water source and to mix the flavored fluid and the water together to form a flavored mixture transferrable to the ice maker.

Preferably, the fluid dispersing module includes a pair of retention arms disposed adjacent the water source inlet port and the ice maker outlet port. The pair of retention arms are sized and configured to frictionally engage opposing ends of the fluid cartridge. Even more preferably, at least one of the pair of retention arms is loaded with a spring for providing tension thereto.

To facilitate replacement of the fluid cartridge, the system may include a first bypass port formed along the water conduit between the water source and the water source inlet port, a second bypass port formed along the water conduit between the ice maker outlet port and the ice maker, and a bypass conduit initiating at the first bypass port and terminating at the second bypass port for placing the water source and the ice maker into fluid communication. Preferably, the bypass conduit is a tubular-shaped pipe. The fluid dispersing module may further include a bypass valve disposed adjacent the first bypass port, the bypass valve being movable between a first position diverting water through the water source inlet port, and a second position diverting water through the bypass conduit.

In another embodiment of the present invention, the system may be formed for retrofit applications to existing consumer refrigerators/freezers such that minimal modification is necessary. Specifically, modification to the existing water conduit to provide a fluid metering orifice which engages with the fluid cartridge's fluid outlet port may be made such that a system for forming flavored ice from an existing consumer refrigerator/freezer may be formed. Where an existing ice maker is fluidly connected to a water source through a water conduit formed therebetween, the water conduit may be modified to provide a fluid metering orifice along a portion thereof. A fluid dispersing module may then be disposed adjacent the fluid metering orifice of the water conduit and the fluid dispersing module may be configured to receive a fluid cartridge. The fluid cartridge may be pre-filled with a metered quantity of a flavored fluid which is mixable with water for attachment to the fluid dispersing module. The fluid cartridge defines a sidewall sized and configured to engage a portion of the water conduit adjacent the fluid dispersing module. The sidewall defines a fluid outlet port sized and configured to engage the fluid metering orifice. The fluid cartridge is connectable to the fluid dispersing module to place the fluid outlet port of the fluid cartridge into fluid communication with the fluid metering orifice of the water conduit so as to expel a portion of the flavored fluid into the water conduit and mix with water from the water source to form a flavored mixture transferrable to the ice maker.

BRIEF DESCRIPTION OF THE DRAWINGS

These as well as other features of the present invention will become more apparent upon reference to the drawings wherein:

FIG. 1 is a side view of the system illustrating the exterior of the refrigerator/freezer having the fluid dispersing module installed in-line with the water conduit;

FIG. 1A is a plan view of the dispensing panel illustrating the selection members disposed thereon;

FIG. 2 is cross-sectional view of fluid cartridge attached to the fluid dispersing module of the system;

DETAILED DESCRIPTION OF THE INVENTION

Figure 3:
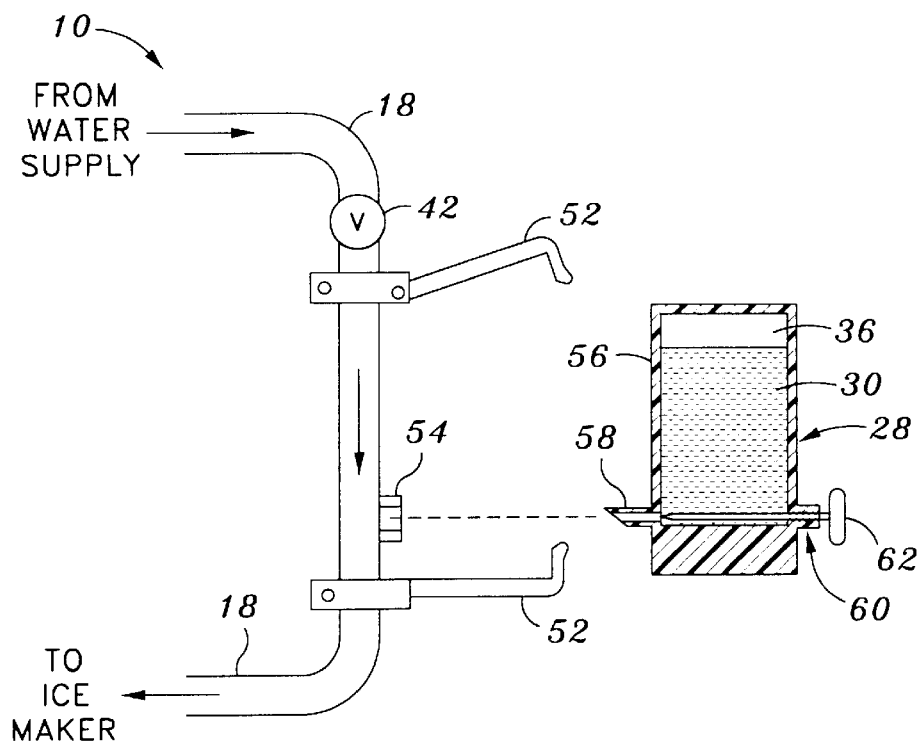
FIG. 3 is an exploded view of the fluid cartridge and the fluid dispersing module of the system.

The detailed description, as set forth below in connection with the appended drawings, is intended as a description of the presently preferred embodiments of the invention, and is not intended to represent the only form in which the present invention may be constructed or utilized.

Referring now to the drawings wherein the showings are for the purposes of illustrating preferred embodiments of the present invention only, and not for the purposes of limiting the same, FIG. 1 illustrates a system 10 for forming flavored ice from a refrigerator/freezer 12 having an ice maker 14 fluidly connected to a water source 16. A water conduit 18 extends between the ice maker 14 and the water source 16. The water conduit 18 may be fabricated from a copper material, a plastic material or other equivalent materials which are advantageous in transporting water/liquid in refrigerated environments. A fluid dispersing module 20 may be formed in-line along a portion of the water conduit 18 or disposed adjacent thereto. Preferably, the water conduit 18 runs through the refrigerator/freezer. 12 into the refrigerated portion 40 thereof and connects to the fluid dispersing module 20 disposed therein. The water conduit 18 may continue to run into a freezer portion 41 of the refrigerator/freezer 12 and into the ice maker 14. Advantageously, such a configuration allows the fluid dispersing module 20 to maintain fluid in a liquid state while receiving water from the water source 16.

Referring now to FIG. 2, a first embodiment of the present invention is illustrated. In particular, the water conduit 18 is formed having a fluid metering orifice 32 along a portion thereof. A fluid dispersing module 20 is disposed adjacent the fluid metering orifice 32 of the water conduit 18. Advantageously, disposing the fluid dispersing module 20 adjacent the water conduit 18 allows for retrofit applications to existing consumer refrigerators/freezers by modifying the water conduit 18 to accept the fluid dispersing module 20.

As particularly shown in FIGS. 2 and 3, the fluid dispersing module 20 defines a pair of retention arms 52 disposed adjacent the water source inlet port 16 and the ice maker outlet port 14. The pair of retention arms 52 are sized and configured to frictionally engage opposing ends of a fluid cartridge 28, as will be described in further detail below. At least one of the pair of retention arms 52 may be loaded with a spring (not shown) for providing tension thereto. Advantageously, the spring allows the retention arms 52 to hingedly swivel and quickly connect to the fluid cartridge 28. Preferably, the retention arms 52 are positioned so as to extend substantially perpendicular with respect to the water conduit 18. Even more preferably, the retention arms 52 form a right-angle bend formed to engage the fluid cartridge 28.

As further shown in FIG. 2, a fluid cartridge 28 pre-filled with a metered quantity of a flavored fluid 30 mixable with water is provided. Preferably, the fluid cartridge 28 defines a fluid reservoir 36 sized and configured to retain the metered quantity of flavored fluid 30 therein. The flavored fluid 30 may be formed from a concentrated syrup which is mixable with water. More specifically, the concentrated syrup may be a desirable flavor such as coffee, fruit flavors, and combinations thereof to form complimentary flavored ice therefrom. The fluid cartridge 28 defines a sidewall 56 sized and configured to engage a portion of the water conduit 18 adjacent the fluid dispersing module 20. Preferably, the sidewall. 56 is sized and configured to lay substantially flush against the water conduit 18 adjacent the fluid metering orifice 54. The sidewall 56 defines a fluid outlet port 58 sized and configured to engage the fluid metering orifice 54 on the water conduit 18. The fluid cartridge 28 is connectable to the fluid dispersing module 20 to place the fluid outlet port 58 of the fluid cartridge 28 into fluid communication with the fluid metering orifice 54 of the water conduit 18 so as to expel a portion of the flavored fluid 30 into the water conduit 18 and mix with water from the water source 16 to form a flavored mixture transferrable to the ice maker 14. Preferably, engaging the sidewall 56 of the fluid cartridge 28 with the water conduit 18 and the retention arms 52 provides simplistic operation of the system 10 in forming flavored ice such that replacement fluid cartridges 28 of different flavors may be utilized.

As shown in FIGS. 2 and 3, the system 10 may further include a regulator valve 60 formed adjacent the fluid outlet port 58. The regulator valve 60 operates to selectively control expulsion of flavored fluid 30 from the fluid cartridge 28 into the water conduit 18. Preferably, the regulator valve 60 is connected to a rotatable knob 62 configured to selectively incrementally adjust the regulator valve 60 between a closed position restricting expulsion of the flavored fluid 30 from the fluid cartridge 28, and an open position allowing expulsion of flavored fluid 30 from the fluid cartridge 28. Advantageously, the regulator valve 60 may be adjusted so as to allow for selective dispersion of the flavored fluid 30 from the fluid reservoir 36 into the water conduit 18. Such adjustability allows one to control the strength/concentration of the flavored ice produced thereby. To allow the flavored fluid 30 to be expelled from the fluid reservoir 36, it is preferred that the water conduit 18 is sized and configured to deliver fluid pressure from the water source 16 to the fluid cartridge 28 in a range of from about 20 PSI to about 100 PSI. Even more preferably, the water conduit 18 is sized and configured to deliver fluid pressure from the fluid cartridge 28 to the ice maker 14 in a range of from about 20 PSI to about 100 PSI. It is has been discovered that such a range of fluid pressures may be existing on current consumer refrigerator/freezer systems and it is therefore desirable to fabricate the fluid cartridge 28 and the fluid outlet port 58 with a size and shape to necessary to expel the flavored fluid 30 from the fluid reservoir 36. Alternatively, other forms of adjustment mechanisms may be utilized and are anticipated as being compatible with the fluid cartridge 28 made according to the present invention.

To facilitate the replacement of the fluid cartridge 28 with replacement fluid cartridges 28, a shut-off valve 42 may be disposed adjacent the water conduit 18 and positioned in-line between the water source 16 and the fluid dispersing module 20 along the water conduit 18. The shut-off valve 42 may be manually adjusted to selectively restrict and allow water to flow from the water source 16 through the water conduit 18 and to the fluid dispersing module 20. Alternatively, it is anticipated that other valves may be used to accomplish the same purpose, i.e. automatic valves and the like.

Figure 4:
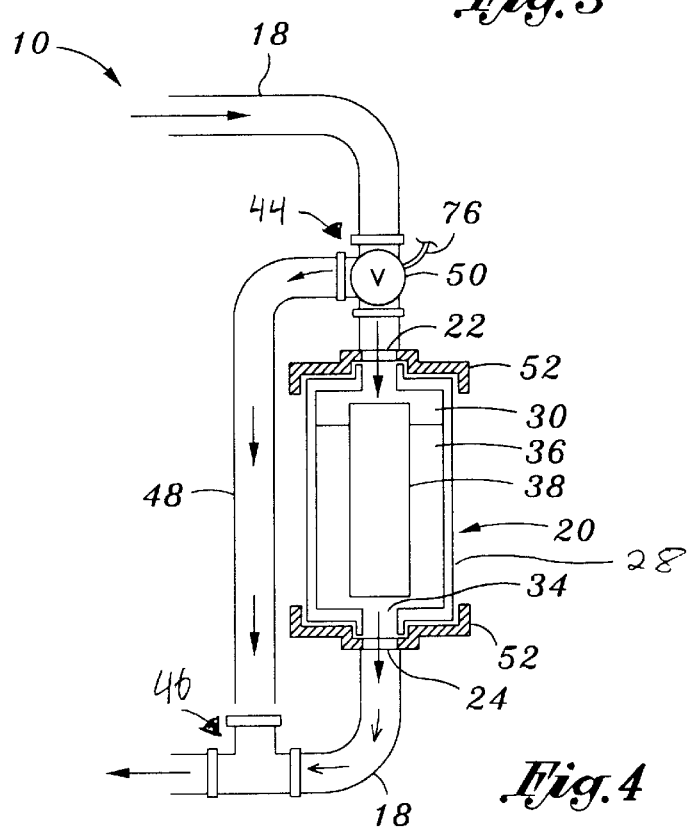
FIG. 4 is a cross-sectional view of the fluid cartridge disposed in-line with the water conduit and having a bypass valve installed adjacent thereto.

Referring now to FIG. 4, a second embodiment of the present invention is illustrated therein. The system 10 as illustrated in FIG. 4 is similar to the first embodiment illustrated in FIGS. 2–3 yet provides for an alternative configuration which places the fluid dispersing module 20 in-line with the water conduit 18. Specifically, the system 10 includes a water conduit 18 extending between the ice maker 14 and the water source 16. The water conduit 18 may be formed as a copper pipe, plastic tube or other equivalent conduits useful in refrigerated environments. A fluid dispersing module 20 is formed in-line along a portion of the water conduit 18. The fluid dispersing module 20 defines a water source inlet port 22 and an ice maker outlet port 24 disposed on opposing ends thereof. The water source inlet port 22 and the ice maker outlet port 24 are placed into fluid communication with the water source 16 and the ice maker 14 respectively. Preferably, the fluid dispersing module 20 includes a pair of retention arms 52 disposed adjacent the water source inlet port 22 and the ice maker outlet port 24. The pair of retention arms 52 are sized and configured to frictional engage opposing ends of the fluid cartridge 28, as will be described below. Preferably, the retention arms 52 are formed having apertures through a center portion thereof such that the water source inlet port 22 and the ice maker outlet port 24 may be fluidly connected to the water conduit 18 and the fluid cartridge 28.

The system 10 further includes a fluid cartridge 28 pre-filled with a metered quantity of flavored fluid 30 mixable with water. Preferably, the flavored fluid 30 is a concentrated syrup. The fluid cartridge 28 also has a cartridge inlet port 32 and a cartridge outlet port 34 formed on opposing ends thereof. The cartridge inlet port 32 and the cartridge outlet port 34 are sized and configured to engage the water source inlet port 22 and the ice maker outlet port 24 respectively. Thus, the fluid cartridge 28 is connectable to the fluid dispersing module 20 and placeable into fluid communication with the water source 16 and the ice maker 18 so as to receive water from the water source 16 and to mix the flavored fluid 30 and the water together to form a flavored mixture transferrable to the ice maker 14.

Preferably, the fluid cartridge 28 defines a fluid reservoir 36 sized and configured to retain the metered quantity of flavored fluid 30 therein. Even more preferably, the fluid reservoir 36 defines a fluid restriction member 38 formed therewithin and being positioned therein to mix a portion of the flavored fluid 30 with the water. In this respect, the fluid restriction member 38 operates to substantially slow and/or impede the flow of water through the fluid reservoir 36 so as to prevent the entire volume of flavored fluid 30 from being expelled from the fluid reservoir 36 at once. The fluid restriction member 38 may be formed having fins or other protrusions which may impede the flow of water through the fluid reservoir 36.

To facilitate replacement of the fluid cartridge 28, as shown in FIG. 4, the system 10 may further include a first bypass port 44 formed along the water conduit 18 between the water source 16 and the water source inlet port 22. A second bypass port 46 may be formed along the water conduit 18 between the ice maker outlet port 24 and the ice maker 14. A bypass conduit 48 is formed initiating at the first bypass port 44 and terminating at the second bypass port 46 for placing the water source 16 and the ice maker 14 into fluid communication. Preferably, the bypass conduit 48 is a tubular-shaped pipe which may be formed from the same material as the water conduit 18 and additionally has substantially the same diameter as the water conduit 18. The fluid dispersing module 20 further includes a bypass valve 50 disposed adjacent the first bypass port 44. The bypass valve 50 is movable between a first position diverting water through the water source inlet port 22, and a second position diverting water through the bypass conduit 48. When diverting water through the bypass conduit 48, the fluid cartridge 28 may be removed from the fluid dispersing module 20 and replaced with another fluid cartridge 28. Advantageously, when the water passes through the bypass conduit 48, the water conduit 18 operates as normal to provide water to the ice maker 14 without any flavored fluid 30 mixed therewith.

Figure 4A:
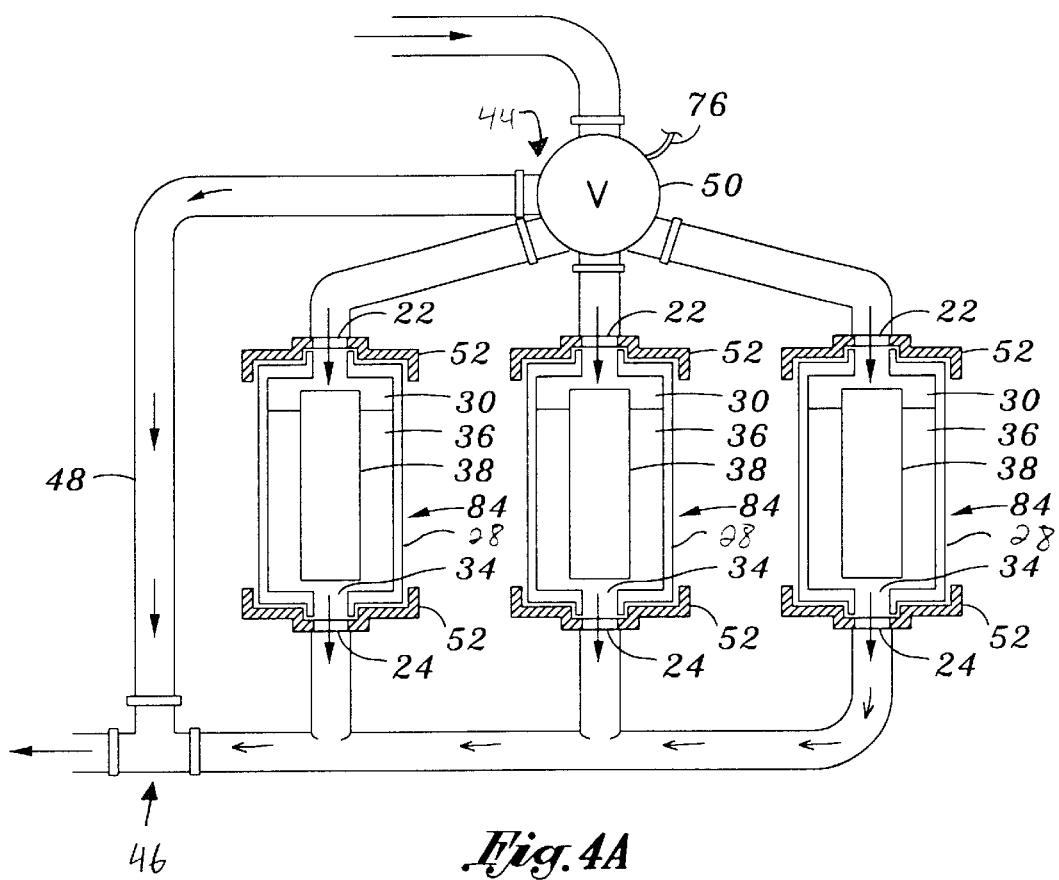
FIG. 4A is a cross-sectional view of a plurality of fluid modules each disposed in-line with the water conduit and having a bypass valve installed adjacent thereto.

Alternatively, as shown in FIG. 4A, the system 10 may be formed to accommodate a plurality of fluid dispersing modules 84 each being formed along the water conduit 18 between the first bypass port 44 and the second bypass port 46. In this respect, each of the fluid dispersing modules may accept a fluid cartridge 28 to allow for multiple different flavor syrups to be mixed with the water to create the flavored ice cubes. To allow the user to select which flavor ice cube should be created, as shown in FIG. 1A, a dispensing panel 80 configured to receive the water conduit 18 from the ice maker 14 may be disposed on a front portion of the refrigerator/freezer 12. The dispensing panel 80 has at least one selection member 82 formed on a portion thereof. Preferably, the at least one selection member 82 is connected to the bypass valve 50 for selectively controlling diversion of water therefrom. In this respect, the bypass valve 50 may be an electrically controllable device which has an electrical lead 76 leading therefrom to the selection member 82. Thus, preferably, the user may activate the selection member 82 without reaching into the refrigerator/freezer 12 to select the desired flavored ice. Additionally, a water button 70 for standard water may be disposed on the dispensing panel 80 while an ice button 70 may be disposed on the dispensing panel 80 for standard ice without any flavoring. Yet, once the selection member 82 is activated, a flavored ice button 74 disposed on the dispensing panel allows the user to dispense the flavored ice of the desired flavor selected from the selection member 82.

To allow the flavored fluid 30 to be expelled from the fluid reservoir 36, it is preferred that the water conduit 18 is sized and configured to deliver fluid pressure from the water source 16 to the fluid cartridge 28 in a range of from about 20 PSI to about 100 PSI. Even more preferably, the water conduit 18 is sized and configured to deliver fluid pressure from the fluid cartridge 28 to the ice maker 14 in a range of from about 20 PSI to about 100 PSI. It is has been discovered that such a range of fluid pressures may be existing on current consumer refrigerator/freezer systems and it is therefore desirable to fabricate the fluid cartridge 28 and the fluid outlet port 58 with a size and shape to necessary to expel the flavored fluid 30 from the fluid reservoir 36. Alternatively, other forms of adjustment mechanisms may be utilized and are anticipated as being compatible with the fluid cartridge 28 made according to the present invention.

Figure 5:
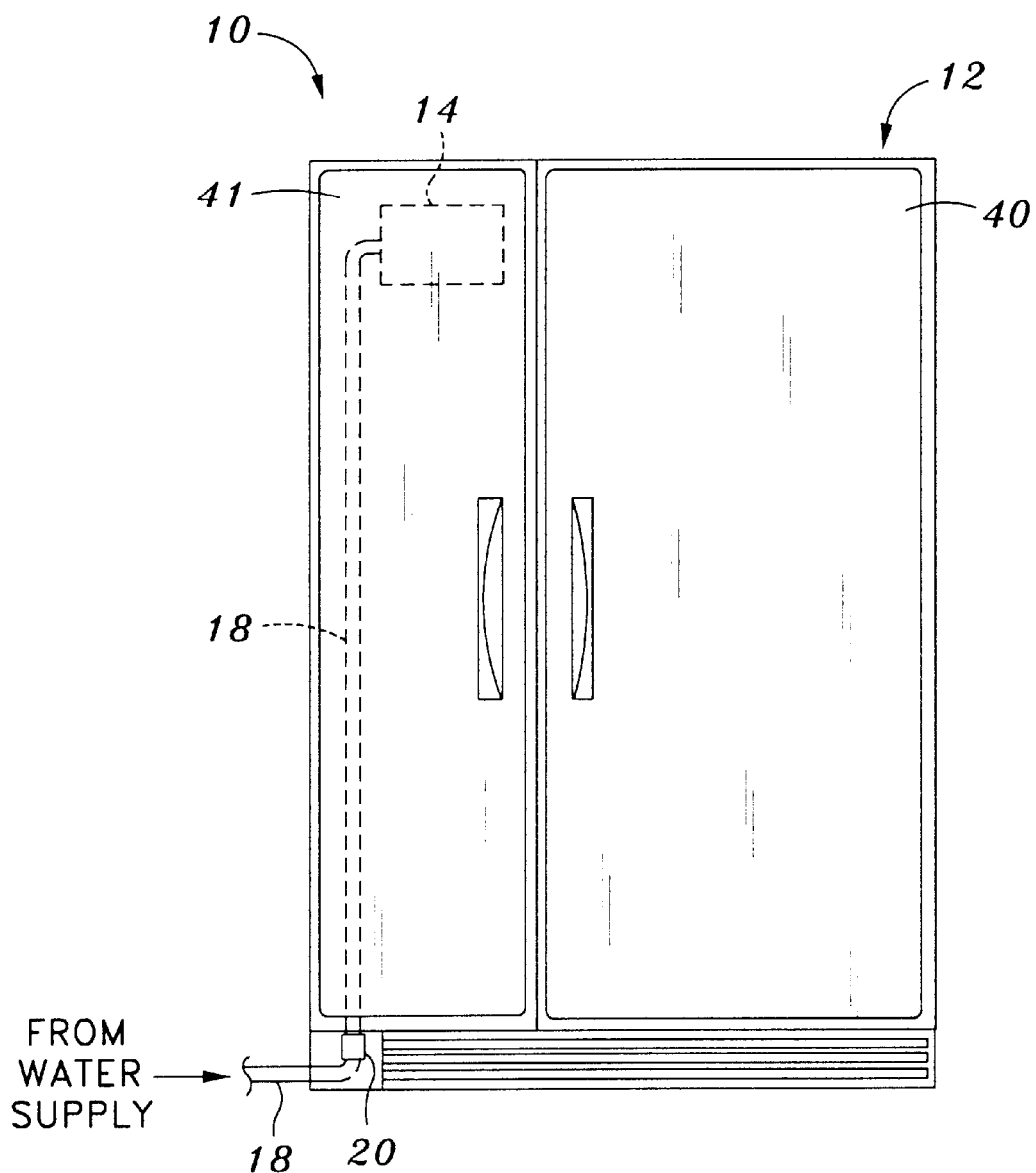
FIG. 5 is a side view of refrigerator/freezer retrofitted with the system formed according to the present invention.

Referring now to FIG. 5, a retrofit application of the system 10 is illustrated. In particular, the system 10 may be retrofitted into an existing consumer refrigerator/freezer 12 which includes both a refrigerated portion 40 and a freezer portion 41. Since the ice maker 14 is disposed within the freezer portion 41 and an existing water conduit 18 is already fluidly connected thereto from the water source 16, a fluid dispersing module 20 may be retrofitted to the water conduit 18. Optionally, the fluid dispersing module 20 illustrated in FIGS. 2–3 may be utilized which is disposed adjacent a fluid metering orifice 54 of the water conduit 18 or the fluid dispersing module 20 illustrated in FIG. 4 may be utilized which is placed in-line with the water conduit 18.

Additional modifications and improvements of the present invention may also be apparent to those of ordinary skill in the art. Thus, the particular combination of parts described and illustrated herein is not intended to serve as limitations of alternative devices within the spirit and scope of the invention.

What is claimed is:

1. A system for forming flavored ice from a refrigerator/freezer having an ice maker fluidly connected to a water source, the system comprising:

a water conduit extending between the ice maker and the water source;

a fluid dispersing module formed along a portion of the water conduit, the fluid dispersing module defining a water source inlet port and an ice maker outlet port disposed on opposing ends thereof, the water source inlet port and the ice maker outlet port being placed into fluid communication with the water source and the ice maker respectively;

a fluid cartridge pre-filled with a metered quantity of a flavored fluid mixable with water, the fluid cartridge having a cartridge inlet port and a cartridge outlet port formed on opposing ends thereof, the cartridge inlet port and the cartridge outlet port being sized and configured to engage the water source inlet port and the ice maker outlet port respectively; and wherein the fluid cartridge is connectable to the fluid dispersing module and placeable into fluid communication with the water source and the ice maker to receive water from the water source and to mix the flavored fluid and the water together to form a flavored mixture transferrable to the ice maker.

2. The system as in claim 1 wherein the fluid cartridge defines a fluid reservoir sized and configured to retain the metered quantity of flavored fluid therein.

3. The system as in claim 2 wherein the fluid reservoir defines a fluid restriction member formed therewithin and being positioned therein to mix a portion of the flavored fluid with the water.

4. The system as in claim 1 wherein the flavored fluid is a concentrated syrup.

5. The system as in claim 1 wherein the fluid dispersing module is disposed within a refrigerated portion of the refrigerator/freezer.

6. The system as in claim 1 wherein the water conduit is a copper pipe.

7. The system as in claim 1 wherein the water conduit is sized and configured to deliver fluid pressure from the water source to the fluid cartridge in a range of from about 20 PSI to about 100 PSI.

8. The system as in claim 7 wherein the water conduit is sized and configured to deliver fluid pressure from the fluid cartridge to the ice maker in a range of from about 20 PSI to about 100 PSI.

9. The system as in claim 1 further including:

a first bypass port formed along the water conduit between the water source and the water source inlet port;

a second bypass port formed along the water conduit between the ice maker outlet port and the ice maker; and a bypass conduit initiating at the first bypass port and terminating at the second bypass port for placing the water source and the ice maker into fluid communication.

10. The system as in claim 9 wherein the bypass conduit is a tubular-shaped pipe.

11. The system as in claim 9 further comprising a bypass valve formed along the water conduit and disposed adjacent the first bypass port, the bypass valve being movable between a first position diverting water through the water source inlet port, and a second position diverting water through the bypass conduit.

12. The system as in claim 9 further comprising a dispensing panel configured to receive the water conduit from the ice maker, the dispensing panel having at least one selection member formed on a portion thereof, the at least one selection member being connected to the bypass valve for selectively controlling diversion of water therefrom.

13. The system as in claim 12 further including a plurality of fluid dispersing modules each being formed along the water conduit between the first bypass port and the second bypass port.

14. The system as in claim 13 further comprising a bypass valve formed along the water conduit and disposed adjacent the first bypass port, the bypass valve being selectively movable between a plurality of positions each diverting water through the water source inlet port of one of the plurality of fluid dispersing modules, and a second position diverting water through the bypass conduit.

15. The system as in claim 1 wherein the fluid dispersing module further includes a pair of retention arms disposed adjacent the water source inlet port and the ice maker outlet port, the pair of retention arms being sized and configured to frictionally engage opposing ends of the fluid cartridge.

16. The system as in claim 15 wherein at least one of the pair of retention arms is loaded with a spring for providing tension thereto.

17. A system for forming flavored ice from a refrigerator/freezer having an ice maker fluidly connected to a water source through a water conduit formed therebetween, the water conduit defining a fluid metering orifice along a portion thereof, the system comprising:

a fluid dispersing module disposed adjacent the fluid metering orifice of the water conduit;

a fluid cartridge pre-filled with a metered quantity of a flavored fluid mixable with water, the fluid cartridge defining a sidewall sized and configured to engage a portion of the water conduit adjacent the fluid dispersing module, the sidewall defining a fluid outlet port sized and configured to engage the fluid metering orifice; and wherein the fluid cartridge is connectable to the fluid dispersing module to place the fluid outlet port of the fluid cartridge into fluid communication with the fluid metering orifice of the water conduit so as to expel a portion of the flavored fluid into the water conduit and mix with water from the water source to form a flavored mixture transferrable to the ice maker.

18. The system as in claim 17 wherein the sidewall is sized and configured to lay substantially flush against the water conduit adjacent the fluid metering orifice.

19. The system as in claim 18 wherein the fluid cartridge further defines a regulator valve formed adjacent the fluid outlet port, the regulator valve being operative to selectively control expulsion of flavored fluid from the fluid cartridge into the water conduit.

20. The system as in claim 19 wherein the regulator valve is connected to a rotatable knob configured to selectively incrementally adjust the regulator valve between a closed position restricting expulsion of flavored fluid from the fluid cartridge, and an open position allowing expulsion of flavored fluid from the fluid cartridge.

21. The system as in claim 17 wherein the fluid cartridge defines a fluid reservoir sized and configured to retain the metered quantity of flavored fluid therein.

22. The system as in claim 17 wherein the flavored fluid is a concentrated syrup.

23. The system as in claim 17 wherein the fluid dispersing module is disposed within a refrigerated portion of the refrigerator/freezer.

24. The system as in claim 17 wherein the water conduit further includes a shut-off valve disposed adjacent thereto and further being positioned in-line between the water source and the fluid dispersing module along the water conduit.

25. The system as in claim 17 wherein the water conduit is a copper pipe.

26. The system as in claim 17 wherein the water conduit is sized and configured to deliver fluid pressure from the water source to the fluid cartridge in a range of from about 20 PSI to about 100 PSI.

27. The system as in claim 26 wherein the water conduit is sized and configured to deliver fluid pressure from the fluid cartridge to the ice maker in a range of from about 20 PSI to about 100 PSI.

28. The system as in claim 17 wherein the fluid dispersing module further includes a pair of retention arms disposed adjacent the water source inlet port and the ice maker outlet port, the pair of retention arms being sized and configured to frictionally engage opposing ends of the fluid cartridge.

29. The system as in claim 28 wherein at least one of the pair of retention arms is loaded with a spring for providing tension thereto.

* * * * *